Figure 1:
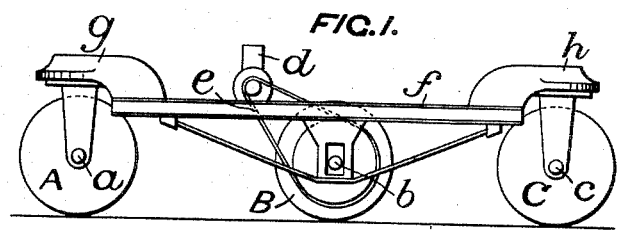

R. E. B. CROMPTON & E. T. J. TAPP.
ROAD ROLLER.
APPLICATION FILED JULY 17, 1913.

1,078,538.

Patented Nov. 11, 1913.

4 SHEETS—SHEET 1.

FIG. 7.
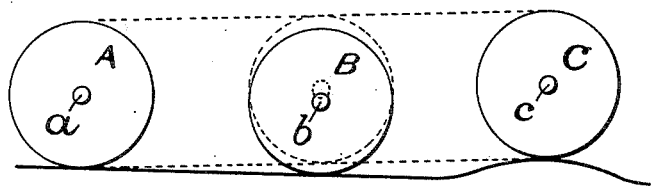
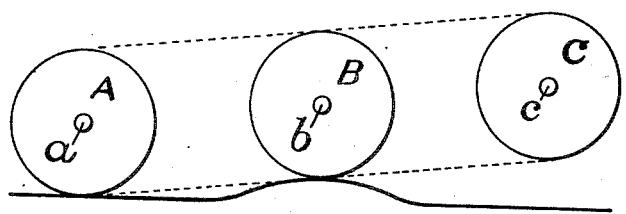
FIG. 8.
FIG. 9.
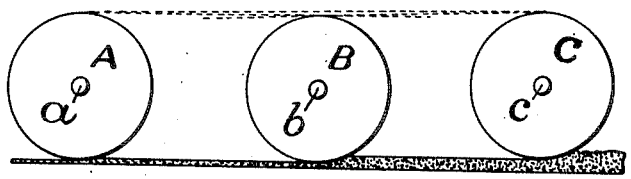

R. E. B. CROMPTON & E. T. J. TAPP.
ROAD ROLLER.
APPLICATION FILED JULY 17, 1913.
1,078,538.　　　　　　　　　　　　　　Patented Nov. 11, 1913.
4 SHEETS—SHEET 4.
FIG. 10.　　　　　FIG. 11.
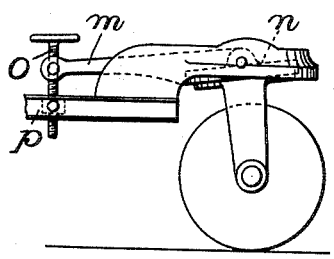 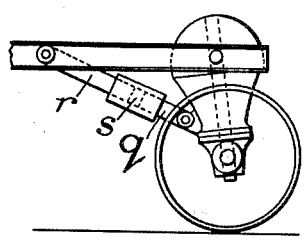
FIG. 12.　　　　　FIG. 13.
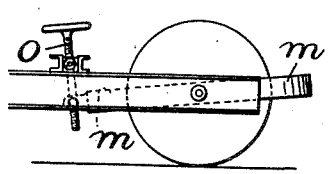 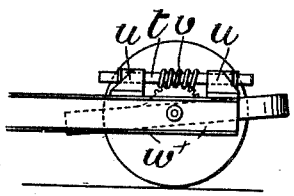
Witnesses:
M. E. McDade
C. D. Kesler
Inventors
Rookes E. B. Crompton
Ernest T. J. Tapp
by
James L. Norris,
Attorney

UNITED STATES PATENT OFFICE.

ROOKES EVELYN BELL CROMPTON AND ERNEST THOMAS JAMES TAPP, OF LONDON, ENGLAND.

ROAD-ROLLER.

1,078,538.

Specification of Letters Patent.

Patented Nov. 11, 1913.

Application filed July 17, 1913. Serial No. 779,615.

*To all whom it may concern:*

Be it known that we, ROOKES EVELYN BELL CROMPTON and ERNEST THOMAS JAMES TAPP, subjects of the King of Great Britain, residing at Thriplands, Kensington Court, London, England, and 7 Manville road, Upper Tooting, London, England, respectively, have invented certain new and useful Improvements in Road-Rollers, of which the following is a specification.

This invention relates to rollers such as are used for preparing and surfacing roads and for other purposes.

It has been found that the road rollers of ordinary construction, that is to say, in which the weight is supported by two axles, have a tendency, unless extraordinary skill is exercised to prevent the phenomenon, to produce regularly recurring undulations or waves upon the road surface. The effect of this phenomenon is serious, for water tends to collect in the troughs of the "waves" and to run off the road, thereby rendering those portions of the road softer and more liable to wear out quickly than are the summits of the "waves." Practical observations have shown that the period or length between successive "wave" summits bears a relation to the distance between the axles of the rollers; and it has been found in practice to be impossible to eliminate the "waves," once they have been formed, by any means other than rolling in a direction transversely of the road or street which is only possible in a very few localities.

This invention has for its object to overcome these disadvantages by so distributing the weight over the surface to be rolled and consolidated that it is finished in a more perfect manner and with a longitudinal contour more free from recurring undulations or "waves" than has hitherto been found possible. To this end the weight of the roller is distributed over more than two axles spaced at unequal distances apart. Means may be provided so as to vary the inclination of some of the rollers for the purpose of producing "banked" surfaces.

A road roller constructed in accordance with the invention may have three, four, five or more axles and corresponding rollers, but it is found that the desired results can be attained satisfactorily with a roller whereof the weight is distributed over three axles whereof the distance separating the axle at one extremity and the center axle is greater than the distance separating the center axle and the axle at the other extremity. The frame by which the weight is distributed over the rollers is constructed so as to be very rigid in a vertical direction and the distribution of the weight can be so arranged if desired that each of the axles carries approximately one-third of the total weight. According to one construction three rollers of sufficient width may be mounted in alinement in a frame carrying the weight and source of motive power. Or instead of this arrangement a large roller may be mounted on an axle disposed near the center of the frame and carrying approximately one-third or more of the weight as hereafter mentioned and the front or rear axles may each be provided with a pair of rollers placed side by side and of small diameter, all arranged so that their tracks to some extent overlap that of the center roller. In another arrangement single rollers may be mounted on the front and rear axles, and a pair of rollers (constituted by broad flat tired wheels) may be carried by the center axle; the distribution of the weight over the various axles being as described above. By making the center roller of large diameter and those of the two end axles of smaller diameter the end axles which must, for steerage purposes, be arranged to be pivoted, can be carried on turntables or their equivalent with great facility, the turntables being supported on prolongations of the upper member of the main frame. In cases where it is desirable to roll roadways curved in plan it may be desirable to provide means for inclining the plane of the steering turntables in relation to the plane of the center roller, as in this way banked or conical surfaces can be produced by rolling and with great accuracy. The angle of inclination of these steering turntables can be made adjustable to suit the circumstances of each case.

It will be seen that with three axles so rigidly connected and the weight so rigidly supported that even if the road roller be used on an existing undulating or wavy surface the three axle roller will have a tendency to correct this waviness as at the time that the center roller passes over a hollow its weight will be partly transferred to the two end rollers which are on the summits thereby causing extra compression at these two points, or when either of the end rollers comes over the hollow or depression a considerable portion of the weight on that end roller will be transferred to the center roller. In this manner it is possible to produce more uniformly even and more uniformly consolidated road surfaces possessing greater wearing properties than have hitherto been possible with the apparatus usually employed.

In carrying out the invention, although we may use any number of axles greater than two, it will be simplest to describe the method of carrying it out by using three axles only, and the accompanying drawings show three alternative arrangements of using three axles in such a manner as to effect our purpose.

Figure 2:
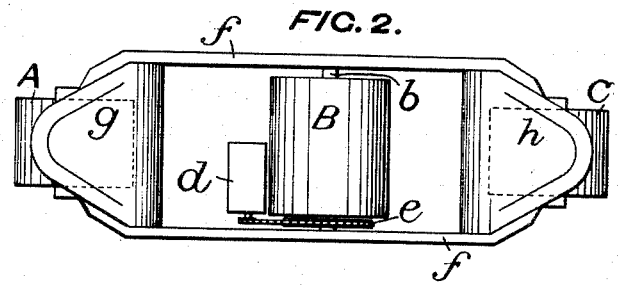
Figure 3:
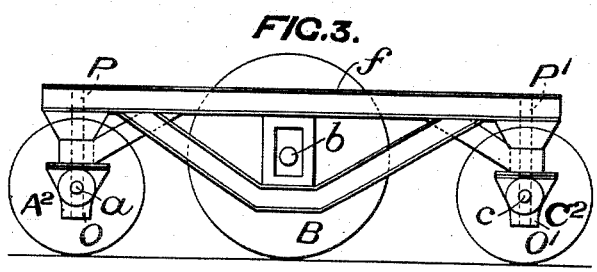
Figure 4:
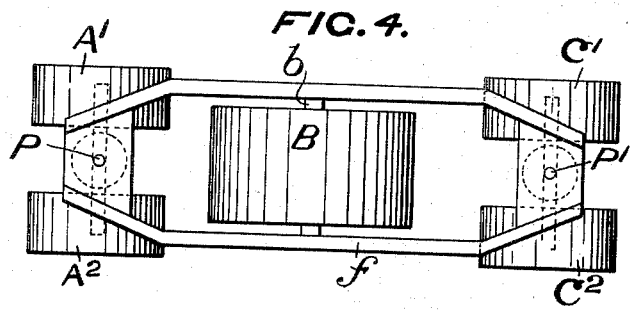
Figure 5:
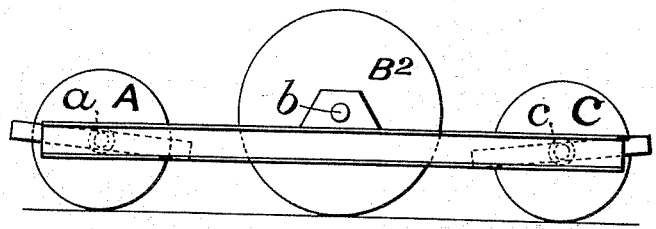
Figure 6:
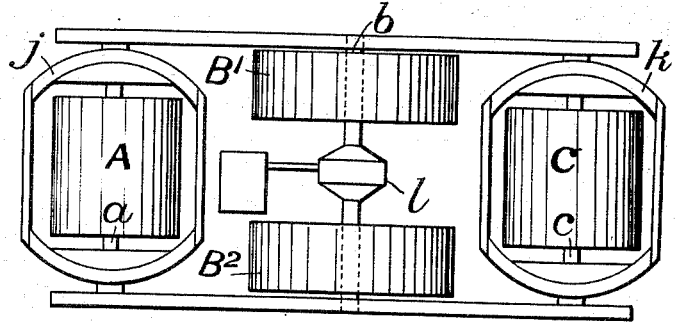

In the drawings, which are diagrammatic for the sake of simplicity, Figure 1 is a side elevation and Fig. 2 is a plan view of one arrangement. Fig. 3 is a side elevation and Fig. 4 is a plan view of a second arrangement, and Fig. 5 is a side elevation and Fig. 6 is a plan of a third arrangement. Figs. 7 and 8 are diagrammatic views illustrating the application of the roller to an uneven surface. Fig. 9 is a diagrammatic view showing a freshly laid surface in course of compression by a roller constructed in accordance with the invention. Figs. 10, 11, 12 and 13 show various means whereby the inclination of the axles or the steering pivots may be varied and controlled for the purpose of producing banked surfaces.

The first method is shown in Figs. 1 and 2; where three single rollers, A, B, C, on three axles $a$, $b$, $c$, are used one to each axle, the center roller serving as the propelling roller, the power being transmitted as shown diagrammatically from the engine $d$ by means of a chain $e$. the two end rollers A, C, being secured to the frame or chassis $f$ by means of the forked turntables $g$, $h$, which are used for the purpose of steering the roller.

The second method is shown in Figs. 3 and 4 which illustrate five rollers $A^1$, $A^2$, B, $C^1$, and $C^2$, arranged with the single roller B on the center axle $b$ and the pairs of rollers $A^1$, $A^2$, $C^1$, $C^2$, on the two end axles $a$, $c$, respectively. The front axle $a$ and rear axle $c$ turn about two pins P and $P^1$ passing from the frame $f$ through the blocks O and $O^1$ to which they are attached for purposes of steering. In this type also the drive is preferably taken by the center roller in any convenient manner.

The third method, shown in Figs. 5 and 6 is carried out by means of an arrangement of four rollers a pair $B^1$, $B^2$, being mounted on the center axle $b$ and one roller A and C on each of the end axles $a$ and $c$ respectively. Here we also show an alternative method of providing for the steering of the end rollers by means of the turntables $j$, $k$ surrounding the end rollers A and C. This arrangement has the advantage that a very low frame can be used; the two center rollers $B^1$, $B^2$, can be utilized for the propulsion of the apparatus and a differential gear $l$ can be mounted either on the axle $b$ itself, or an alternative arrangement may be adopted by mounting these center rollers $B^1$, $B^2$, so as to revolve independently on their axle and be driven by a countershaft which would be provided with a differential gear.

The rollers may be of equal or varying diameter but it is advisable that the axle taking the drive, should when necessary be required to support more than one third of the weight and that the roller or rollers attached to this axle should therefore have a greater area of contact with the road than the others.

In some instances it may be necessary to arrange that all the rollers are driving rollers in which case power can be transmitted to the steering roller by bevel gears through the steering axles, or an arrangement of flexible couplings or other equivalent mechanical devices or hydraulic or electrical means of driving may be used.

In order that the center driving axle $b$ with its roller or rollers may bring sufficient weight to propel the whole machine when, owing to irregularity of the road surface said center axle supports less than its own share of the total weight of the roller, said center axle is so attached and fixed as to allow it to sink so far that its lower rolling surface may be below the corresponding surfaces of the end rollers, and so remain in contact with the road, but this vertical play must be confined to the downward direction so that the roller cannot rise above a certain point relative to the frame of the machine as indicated in Fig. 7, where the front roller C is shown passing over the summit of a convex or high point on the road surface (which would cause the center roller B if confined rigidly in place to lose part or the whole of its insistant weight of its adhesion and consequent driving power) and where the roller B is therefore shown to have sunk below its normal position (indicated by the dotted lines) down to the position shown by full lines. When however this center roller B in turn passes over the same high point as shown in Fig. 8, an increased proportion of the whole weight of the machine is thrown on to this center axle $b$ and thus the desired action of putting extra pressure on to this high portion of road surface is satisfactorily obtained. The same result may be obtained by allowing one or both the end rollers to rise above but not to fall below a certain point relative to the frame.

In Fig. 9 there is shown a three axle roller compressing freshly laid road material and it will be seen that the points of contact of the rollers with the material are not in the same horizontal alinement and that although the rollers are of equal diameter their axles are during this operation not necessarily in the same plane. This is due to the lowering of the normal position of the center roller B above referred to. We can obtain the same action by allowing one or both of the end axles $a$, $c$ to rise above their normal position although they are constrained so as not to fall below a fixed point relative to the frame.

In all the three arrangements shown we consider it imperative that the axles be unevenly spaced apart i. e. the distance from the axle $a$ to the axle $b$ should not be the same as the distance from $b$ to $c$. We find this necessary to prevent the production of any form of recurring wave on the road surface which if once commenced might continue to set up rhythmical or harmonic undulations with increasing intensity but which is obviously impossible with the irregularly spaced axles.

In rolling curved and banked surfaces such as occur on motor or cycle racing tracks and which it may be advisable to apply in some cases to ordinary highways, it is necessary that the steering axles or the pivots of the front and rear axles $a$ and $c$ should be arranged so that they may be inclined in the vertical plane, this angle of inclination allowing all the rollers to rest squarely and fairly all over their contact line upon the surface that is required to be rolled. This angle of inclination of the steering axles is determined by the angle of the banking, by the radius of the curve, and by the wheel base of the roller. It must therefore be made adjustable within limits and we can provide means of doing this by several well known mechanical devices such as are illustrated by way of example in Figs. 10, 11, 12 and 13. In Figs. 10 and 11 alternative methods of varying the inclination of the steering pivots are illustrated. Thus, in Fig. 10 a rearwardly extending lever $m$ is attached at one end to the steering crown $n$ and at its opposite end is formed with a screw-threaded aperture taking over and adapted to work as a nut upon a correspondingly screw-threaded rod $o$ mounted in a block $p$ supported by the chassis so as to permit of angular movement of the rod $o$. The rod $o$ is provided at its upper end with a hand wheel; and by turning the rod the lever $m$ is adapted to travel up or down same and so vary the inclination of the steering pivot. In Fig. 11 a radius rod $q$ is anchored to the steering fork and a second radius rod $r$ is anchored to the chassis, while a sleeve $s$ screw-threaded internally to take over correspondingly screw-threaded portions on the rods $q$ and $r$ is adapted to be caused by means of a suitable spanner, tommy bar or the like to draw the rods $q$ and $r$ together or to separate same so as to incline the steering forks. Fig. 12 shows the application of the mechanism illustrated in Fig. 10 to a roller constructed with turn-tables as in Figs. 5 and 6, and this modification operates similarly to that described with reference to Fig. 10. Fig. 13 shows a modified device for inclining the turn tables, which consists of a shaft $t$ mounted in bearings $u$, $u$, disposed on the chassis and having solid therewith a worm $v$ which meshes with a worm wheel $w$ solid with the turn-table. The shaft $t$ may be provided with squared ends to receive a key or spanner for the purpose of turning same. Either of these constructions may be arranged at both ends of the apparatus. In practice the driver of the roller will be provided with the requisite data to enable him to adjust the steering pivots or the turn-tables to produce banking of the desired angle, and before starting to roll the particular surface he will regulate or set the inclination of the steering pivots or turn-tables accordingly. By thus inclining the steering pivots or turn-tables the front and rear rollers will be constrained to rest squarely on the road when the apparatus is steered upon a curve and will thus produce a banked surface. If desired indicating mechanism may be provided in connection with these inclining devices in order to enable the driver to set same for certain standard conditions.

What we claim is:—

1. Rolling apparatus for producing true surfaces on roadways and for other purposes, comprising a body carrying more than two axles, said axles being arranged at unequal distances apart, and rollers mounted upon said axles.

2. Rolling apparatus for producing true surfaces on roadways and for other purposes, comprising a body carrying more than two axles, said axles being arranged at unequal distances apart, some of said axles being capable of vertical displacement in a downward direction relatively to said body and being limited in regard to vertical displacement in an upward direction, and rollers mounted upon said axles.

3. Rolling apparatus for producing true surfaces on roadways and for other purposes, comprising a body carrying more than two axles, said axles being arranged at unequal distances apart, some of said axles being capable of vertical displacement in a downward direction relatively to said body and being limited in regard to vertical displacement in an upward direction, some of said axles being fixed in regard to vertical movement relatively to said body, and rollers mounted upon said axles.

4. Rolling apparatus for producing true surfaces upon roadways and for other purposes, comprising a body carrying more than two axles, said axles being arranged at unequal distances apart, rollers mounted upon said axles, and means to incline some of said rollers to cause said rolling apparatus to produce curved or banked surfaces.

5. Rolling apparatus for producing true surfaces upon roadways and for other purposes, comprising a body carrying more than two axles, said axles being arranged at unequal distances apart, rollers mounted upon said axles, and means to incline the endmost rollers to cause said rolling apparatus to produce curved and banked surfaces.

6. Rolling apparatus for producing true surfaces upon roadways and for other purposes, comprising a body carrying more than two axles, said axles being arranged at unequal distances apart, some of said axles being capable of vertical displacement in a downward direction relatively to said body and being limited in regard to vertical displacement in an upward direction, rollers mounted upon said axles, and means to incline some of said rollers to cause said rolling apparatus to produce curved and banked surfaces.

7. Rolling apparatus for producing true surfaces on roadways and for other purposes, comprising a body carrying more than two axles, said axles being arranged at unequal distances apart, some of said axles being capable of vertical displacement in a downward direction relatively to said body and being limited in regard to vertical displacement in an upward direction, some of said axles being fixed in regard to vertical movement relatively to said body, rollers mounted upon said axles and means to incline some of said rollers to cause said rolling apparatus to produce curved and banked surfaces.

8. Rolling apparatus for producing true surfaces on roadways and for other purposes, comprising a body carrying more than two axles, said axles being arranged at unequal distances apart, some of said axles being capable of vertical displacement in a downward direction relatively to said body and being limited in regard to vertical displacement in an upward direction, some of said axles being fixed in regard to vertical movement relatively to said body, rollers mounted upon said axles, and means to incline the endmost of said rollers to cause said rolling apparatus to produce curved and banked surfaces.

In testimony whereof we have hereunto set our hands in presence of two subscribing witnesses.

ROOKES EVELYN BELL CROMPTON.
ERNEST THOMAS JAMES TAPP.

Witnesses:
   EUSTACE H. BARKER,
   ARTHUR T. WAGHORN.